INVENTORS
ERHARD J. SCHIMITSCHEK
EDWARD R. SCHUMACHER
COREY G. COOK

ATTORNEYS

United States Patent Office 3,521,190
Patented July 21, 1970

3,521,190
LIQUID LENS LIQUID LASER CELL
Erhard J. Schimitschek and Edward R. Schumacher, San Diego, and Corey G. Cook, Imperial Beach, Calif., assignors to the United States of America as represented by the Secretary of the Navy
Filed July 25, 1967, Ser. No. 656,631
Int. Cl. H01s 3/02
U.S. Cl. 331—94.5      4 Claims

ABSTRACT OF THE DISCLOSURE

The optical cavity of the present cell is formed principally of an elongate cylindrical casing which carries a tubular insert, both of these numbers being formed of thin-walled light-transmissive material. Near each end portion of the tubular insert is a pair of cavity-partitioning means which divides the casing interior into a liquid lens chamber and lasing liquid reservoir, the latter being formed at the casing end portions. Preferably, the tubular insert projects through the partitioning means into openended liquid communication with the reservoir at each end portion. The liquid lens chamber is filled with a fluid material having a desired predetermined index of refraction. Further, all parts of the cell are removably mounted to permit ready substitutions of the lasing liquid, the lens material, and the tubular insert.

---

Figure 1:
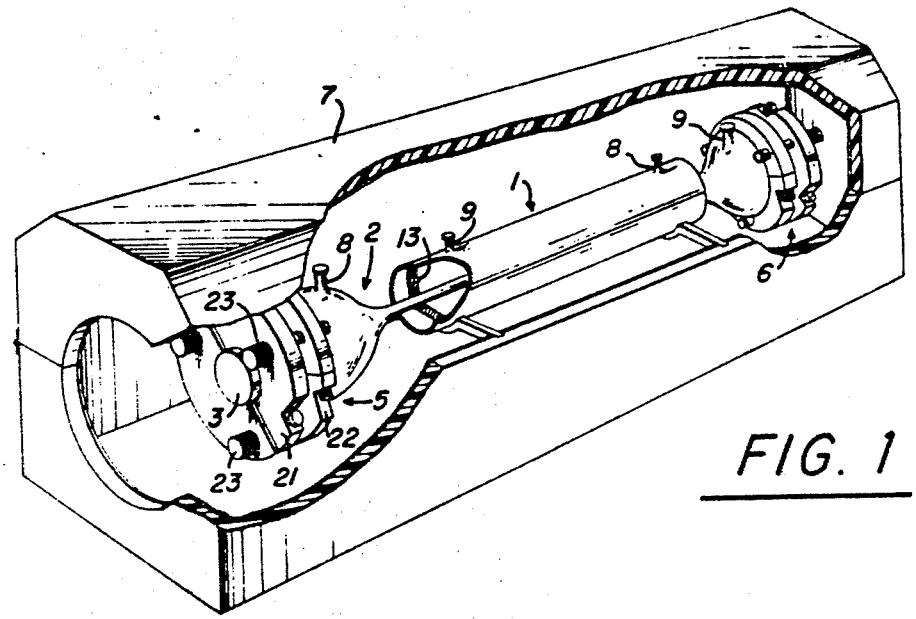

The invention described herein may be manufactured and used by or for the Government of the United States of America for governmental purposes without the payment of any royalties thereon or therefor.

As apparent in the foregoing abstract, the present invention relates to liquid laser cells and, in particular, to cells adapted for experimental testing of the characteristics of various lasing solutions. One type of liquid laser cell presently in common use is formed principally of an elongate relatively thick-walled quartz tube provided with an axial capillary passage which contains the liquid lasing solution. Confocal mirrors are mounted at each end of the tube and in the conventional manner, the cell may be mounted in a housing which further mounts an energy source, such as a xenon flash lamp as well as means to recirculate the lasing solution to maintain a constant solution temperature. An example of such a cell is shown in a copending patent application entitled "Recirculating Liquid Laser Cell," Ser. No. 429,181, filed Jan. 29, 1965 and now abandoned. The recirculating feature of Ser. No. 429,181 may be employed in the present invention but is not intended to constitute one of its essential features.

Although cells of this type operate in a satisfactory manner, they also have certain disadvantages particularly for use as experimental or test cells customarily used to provide data pertinent to lasing solution characteristics or the effects on stimulated emission of variations in the physical characteristics of the cell components. For example, the most suitable size or diameter of the capillary bore of these cells is dependent to a large extent upon the particular lasing solution being used. Obviously, in the referenced thick-walled quartz or Pyrex tubes the diameter of the capillary is fixed so that tests or experiments with substitute solutions require the fabrication of new cells in which this one parameter is varied. Such fabrication is not only expensive but, in constructing the new cell there is no assurance that the other parameters will remain constant. As a consequence, data obtained with the new cell may or may not be due to the change in the single parameter so that the new data may not be scientifically reliable. Also, the referenced cells lack a capability of conveniently varying or controlling the flash lamp light refraction. Instead each such cell refracts light to a fixed degree dependent upon the thickness and composition of its quartz walls which form the capillary. Since test data is somewhat dependent upon the index of refraction, experimental findings obtained by using different cells again may be suspect.

Prior cells further support their confocal mirrors in a substantially fixed, unvariable position which may not be precise particularly when other physical parameters of the cell are varied and, again, the inflexibility of this parameter causes difficulties and raises questions regarding the efficacy of resulting experimental data.

It is, therefore, the primary object of the present invention to provide a liquid laser cell principally adapted for test purposes which is entirely flexible to the extent that each of its component parts which may affect the resulting experimental data can be varied independently of the other components.

A more specific object is to provide a liquid laser cell in which the size of the capillary passage which contains the lasing solution can be readily varied.

Another object is to control pump light refraction this object being accomplished by the use of a liquid lens material which can be readily replaced by another liquid material having a differing index of refraction.

A further object and feature of the present cell resides in the use of adjustable mirrors to assure a precise confocal arrangement. Considered in a more general manner, the invention contemplates the provision of a cell in which each of the component parts can be removed and replaced to permit the so-called flexibility which has been discussed previously.

These and other objects of the invention are achieved primarily by providing a cell formed of a thin-walled, tubular casing which mounts a capillary insert, the interior of the cell being divided into a liquid lens chamber and a liquid lasing solution reservoir. The physical structure arrangement and operation of these components, as well as those of other significant features of the invention, will be considered in detail in the ensuing description.

Figure 2:
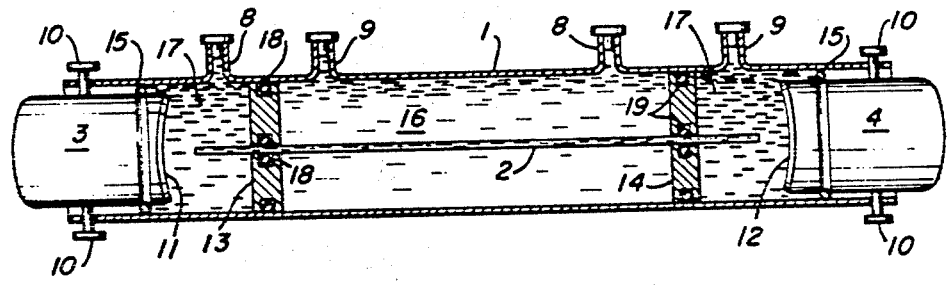

The invention is illustrated in the accompanying drawings of which FIG. 1 is a perspective view of a liquid laser cell housing, the housing being broken away to illustrate the present cell; FIG. 2 is schematic sectional view of one form of the present liquid laser cell, and FIG. 3 a view similar to FIG. 1 illustrating another form of cell which employs a special mirror arrangement.

Referring to FIG. 1 of the drawings, the present liquid laser cell generally includes a tubular casing member 1, an elongate tubular insert member 2, optical mirrors 3 and 4, adjustable mirror holders 5 and 6, as well as other components to be described. The entire arrangement is mounted in a housing 7 which protects and provides support for the cell members, the housing being a conventional member presently illustrated principally to clarify the environment in which the cell functions. As is known, a xenon flash lamp (not shown) is included in the housing to provide the pumping energy for the liquid lasing solution. Casing 1 as well as insert tube 2 both are provided at their end portions with inlet and outlet fittings 8 and 9, respectively, these fittings being provided to permit the cell to be coupled to the recirculating circuits. However, since recirculation is not a feature of the present invention, fittings 8 and 9 may be considered plugged and their present use limited to that of providing access openings permitting filling of the interior cavities with various liquids. The recirculation technique which, if desired may be employed in the present cell generally is described in the previously referenced copending patent application.

One form of the present invention is schematically shown in FIG. 2 which, as may be noted, is quite similar to the embodiment of FIG. 1, the principal difference being that in FIG. 2, casing 1 is extended longitudinally a sufficient amount to permit the insertion of mirrors 3 and 4 into its end portions. Preferably, the mirrors are formed as quartz piston members having concave inner end surfaces coated with a refractive material to form mirror surfaces 11 and 12. In operation, stimulated light produced by energy transfer caused by the pumping of the lasing solution is reflected between the mirror surfaces until emitted through one of the mirror surfaces as the collimated, lasing beam. Obviously, one of the mirror surfaces must be sufficiently light-transmissive to permit the passage of the beam. The other mirror surface is opaque. Further, as will be recognized by those familiar with this art, the mirror surfaces must be precisely formed to provide the confocal arrangement needed to cause the reflection and subsequent emission collimated. Also the mirrors are fully adjustable to the extent that they can be reciprocated axially as well as tilted about their longitudinal axes to provide a precise confocal setting. As shown in FIG. 2 set screws 10 permit the tilting. Reciprocability is permitted by a loose fitting of the pistons in the casing, the pistons being sealed by O-rings 15.

Other features of the present invention relate more particularly to the employment of external casing 1 and its insert 2. Both of these members, preferably are formed of quartz or other light-transmissive materials and both are thin-walled to permit to transmission of light with minimum absorption. To provide some indication of the relative sizes of these two members, one preferred form of the invention utilizes a casing member 1 having a 5 mm., I.D., insert tube 2 of this particular cell having a .5 mm., I.D. However, the internal diameter of the insert member is not a limiting consideration since, as will be discussed, a featured advantage is to permit an arrangement enabling insert tube 2 to be replaced by other inserts of varying sizes.

Another significant aspect of the present cell is the fact that it employs a so-called liquid lens rather than the more conventional quartz lens provided by the thicker-walled quartz tubes. To provide this liquid lens the cell includes partitioning members 13 and 14 mounted to divide the interior of the casing into a liquid lens chamber 16 and liquid lasing solution reservoirs 17. Partition members 13 and 14, which may be formed of any suitable washer-like material, are mounted one on each end of insert 2 and extend radially into a flush and sealing contact with the interior walls of casing 1. Most suitably, O-rings 18 and 19 provide the necessary seals. Insert tube 2 projects through the inserts into an open ended communication with reservoirs 17 at each end of the casing so that liquid lasing solution in the reservoirs also flows into and through tube 2.

Such being the arrangement, the present invention contemplates filling chamber 16 with a liquid lens material having certain desired characteristics best suited for the particular experimentation being conducted. Obviously various liquids can be employed to permit varying indices of refraction or to provide a filtering action for the pump light. In practice, distilled water has been employed as a basic lens material suitable for work with various rare earth chelate solutions. In contrast to the present liquid lens, it is again noted that previous cells employed relatively thick quartz or Pyrex tubes containing a capillary bore, and, in such cells, the quartz itself provided the lens.

Since the primary effort in most experimentation is to obtain data on various liquid lasing solutions, it is, of course, contemplated that these solutions will vary widely. For example, considerable experimentation using the present test cell has been conducted with lasing solutions formed of rare earth chelates. Examples of such solutions are provided in copending patent applications Ser. Nos. 418,358 filed Dec. 14, 1964 and 591,376 filed Oct. 31, 1966, these particular solutions being so-called room-temperature lasing solutions in that they are capable of demonstrating stimulated emission within a temperature range of $-40°$ C.$-+30°$ C. More specifically, these solutions are fluorinated europium chelates dissolved in acetonitrile, the solution of the latter reference being a substituted benzoyltrifluoroacetylacetonate in which the substituents are selected from a group of halogens and the substitutions are made in the benzene ring in the ortho, meta or para positions. The experimentation provided valuable data on the characteristics of each solution particularly since the substitution of one solution for another could be achieved without varying other test parameters.

The FIG. 1 cell differs from that shown in FIG. 2 principally in its physical arrangement of the parts. Thus, it can be noted in FIG. 1 that casing 1 is terminated short of end mirror members 3 and 4 and, as may be seen, insert tube 2 extends outwardly through its partitioning members 13 and 14, the outward extensions being enlarged into bulbous shapes which provide the lasing liquid reservoirs 17. The enlarged ends of insert 2 are closed by mirror members 3 and 4, adjustable mirror holders 5 and 6 being employed for this purpose. Each mirror-holder is formed of a pair of split rings 21 and 22 adapted to be clamped about both the mirror and the enlarged end of tube 2. As may be noted, ring member 21 clamps about the mirror while ring member 22 clamps about the enlarged end of the insert. Liquid-tight sealing members, such as conventional O rings, are mounted on the inner end of the mirrors to provide the necessary seal. Adjustability is achieved by threading a plurality of threaded screws 23 through the split ring members. More specifically, each of these screws has a threaded end received in tube-clamping ring 22, the outer end of the screws mounting a knurled knob permitting manual adjustments. The portion of the screws extending between the pairs of rings mounts a small spring. As each of the knobs is turned, outer ring 22, which is clamped about the mirror, is moved toward or away from the inner ring 22. Consequently, the mirror members can be tilted in any direction from a normal horizontal axis so that the interior mirror surfaces of the members can be brought into a precise confocal setting.

Figure 3:
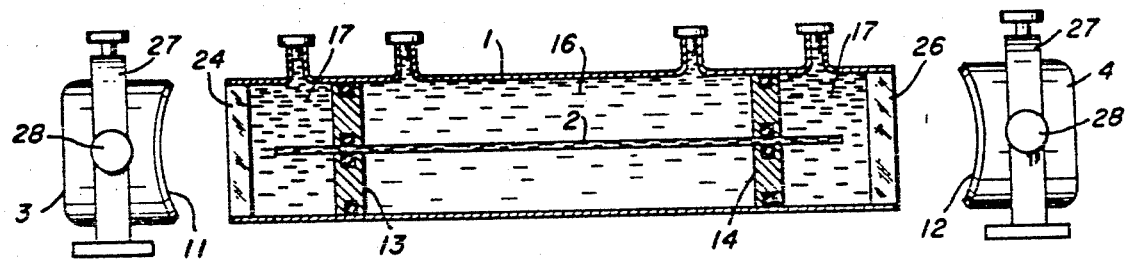

FIG. 3 illustrates in schematic form a third embodiment in which the principal modification is that mirror members 3 and 4 are mounted externally of both the casing and its insert. Further, the casing ends are tightly closed by removable plugs 24 and 26. Adjustability of the mirrors and the mirror surfaces in FIG. 3 may be accomplished in any manner such as by mounting the mirror members on standards 27 which encircle the mirrors and by providing set screws 28 threaded through the ring portion of the standards into contact with the mirrors. The advantage of the exterior mirrors is that these mirrors can be maintained in an originally-fixed position while other changes are being made in the casing portion of the cell. Also, in operation such a cell can be driven harder since plugs 24 and 26 are better able to resist the resulting tendency to be forced outwardly.

As has been previously indicated, the principal advantage of the present arrangement is that it provides an experimental or test laser cell in which various parameters can be changed to provide data dependent exclusively upon the change of a single parameter. Thus, each cell of the various modifications can be completely taken apart to permit the substitution of a different liquid lens material, or a different lasing solution as well as to permit a tubular insert of a differing internal diameter to be substituted for that previously tested. Further, after each substitution of either the materials or the insert, the mirrors can be adjusted to assure precise light-reflecting operation. Consequently, the arrangement permits far greater flexibility than previously was obtained with the heavy wall quartz capillary tubes so that the data obtained with regard to the differing lasing solutions can be studied and analyzed with increased greater scientific accuracy.

Obviously many modifications and variations of the present invention are possible in the light of the above teachings. It is therefore to be understood that within the scope of the appended claims the invention may be practiced otherwise than as specifically described.

What is claimed is:
1. A liquid laser cell for producing a stimulated light emission when subjected to a pumping light source, the cell comprising:
   an elongate cylindrical casing formed of a thin-walled light-transmissive material,
   an elongate capillary tubular insert disposed within the casing and also formed of a thin-walled light-transmissive material,
   mirror means mounted at each end of the casing for optically reflecting and permitting egress of said stimulated light,
   partitioning means disposed near each end of said insert and extending between the casing and the insert for forming a space between the partitioning means into a liquid lens chamber,
   means forming a lasing liquid reservoir externally of said partitioning means at each end of said tubular insert,
   said capilliary tubular insert having its ends projecting through each partitioning means into open-ended liquid communication with said reservoirs,
   said reservoirs serving to contain a particular lasing liquid;
   said chamber serving to contain a liquid lens material having a desired predetermined index of refraction, and
   means for filling and draining each of said reservoirs and said chamber for permitting substitution of other liquid materials,
   said capillary tubular insert being mounted in said casing for removal through an end of said casing for permitting the substitution of other inserts.

2. The cell of claim 1 wherein said mirror means each is formed of a light-transmissive piston-like member having its interior face formed as a concave lens and coated with a reflective material, the reflective material on one of said pistons being opaque and the material in the other being sufficiently light-transmissive to permit egress of a laser beam,
   said cell further including means for adjusting said mirror means to provide a precise confocal setting of said mirror surfaces.

3. The cell of claim 2 wherein said casing end walls mount removable light-transmissive plug members and said insert is disposed within said casing between said plug members,
   said mirror means being mounted externally of said casing spaced from said plug members.

4. The cell of claim 2 wherein said insert projects outwardly of each end of the casing,
   said outwardly-projecting portions of the insert being enlarged to form bulbous reservoirs,
   said mirror-adjusting means being mounted on said bulbous reservoirs, and
   said piston-like members being formed as liquid-tight closures for said reservoirs.

References Cited
UNITED STATES PATENTS

| | | | |
|---|---|---|---|
| 3,225,307 | 12/1965 | Weissman | 331—94.5 |
| 3,242,439 | 3/1966 | Rigden et al. | 331—94.5 |
| 3,319,183 | 5/1967 | Lempicki et al. | 331—94.5 |
| 3,356,966 | 12/1967 | Miller | 331—94.5 |

RONALD L. WIBERT, Primary Examiner

C. CLARK, Assistant Examiner